US012115690B2

(12) United States Patent
Kopelas et al.

(10) Patent No.: US 12,115,690 B2
(45) Date of Patent: Oct. 15, 2024

(54) MAGNETIC LOCK AND RELEASE MECHANISM FOR SKINCARE DEVICE

(71) Applicant: BIC VIOLEX S.A., Anoixi (GR)

(72) Inventors: Panagiotis Kopelas, Anoixi (GR); Sam Pearce, Nottinghamshire (GB)

(73) Assignee: BIC Violex Single Member S.A., Anoixi (GR)

( * ) Notice: Subject to any disclaimer, the term of this patent is extended or adjusted under 35 U.S.C. 154(b) by 186 days.

(21) Appl. No.: 17/223,147

(22) Filed: Apr. 6, 2021

(65) Prior Publication Data

US 2021/0339416 A1 Nov. 4, 2021

(30) Foreign Application Priority Data

Apr. 29, 2020 (EP) .................................... 20172101

(51) Int. Cl.
*B26B 21/52* (2006.01)
*B26B 21/22* (2006.01)

(52) U.S. Cl.
CPC .......... *B26B 21/521* (2013.01); *B26B 21/222* (2013.01)

(58) Field of Classification Search
CPC .............................. B26B 21/52; B26B 21/521
USPC ........................................................... 30/532
See application file for complete search history.

(56) References Cited

U.S. PATENT DOCUMENTS 9,579,809 B2 * 2/2017 Hawes .................. B26B 21/521
10,335,970 B2 * 7/2019 Hashimoto ........... B26B 21/521
10,350,774 B2 7/2019 Wilson et al.
10,639,807 B2 * 5/2020 Wilson .................. B26B 21/521
10,807,260 B2 * 10/2020 Hitchcock ............. B26B 21/521
10,894,331 B2 * 1/2021 Wilson .................. B26B 21/521
10,974,403 B2 * 4/2021 Chang ................... B26B 21/521
11,007,661 B2 * 5/2021 Mazarakis ............ B26B 21/521
11,117,279 B2 * 9/2021 Georgakis ............. B26B 21/521
11,186,003 B2 * 11/2021 Wilson .................. B26B 21/521
11,230,023 B2 * 1/2022 Petratou ................ B26B 21/521
11,273,565 B2 * 3/2022 Good .................... B26B 21/521
11,345,056 B1 * 5/2022 Wang .................... B26B 21/521
11,420,352 B2 * 8/2022 Kopelas ................ B26B 21/521
11,465,306 B2 * 10/2022 Good .................... B26B 21/521
(Continued)

FOREIGN PATENT DOCUMENTS

DE 102009050344 A1 * 5/2011 ........... B26B 21/225
DE 202020107632 U1 * 1/2021 ........... B26B 21/521
(Continued)

OTHER PUBLICATIONS

European Search Report in corresponding Application No. EP20172101.6, dated Sep. 29, 2020 (7 pages).

*Primary Examiner* — Jason Daniel Prone
(74) *Attorney, Agent, or Firm* — Bookoff McAndrews, PLLC

(57) ABSTRACT

A connector for connecting a shaving head to a handle of a skincare device, comprising a first piece configured to be connected to the shaving head, a second piece configured to be connected to the handle, at least a first magnet connected to the first piece, at least a second magnet connected to the second piece, the first and second pieces being insertable inside each other along an insertion direction, such that equal poles of the first and second magnets are arranged obliquely or perpendicularly to the insertion direction for retaining the first and second pieces inside each other through magnetic repulsion.

20 Claims, 3 Drawing Sheets

(56) References Cited

U.S. PATENT DOCUMENTS

| | | | | |
|---|---|---|---|---|
| 2009/0255136 | A1 | 10/2009 | Blackburn | |
| 2015/0174775 | A1 | 6/2015 | Hodgson | |
| 2015/0174776 | A1 | 6/2015 | Hawes | |
| 2016/0121496 | A1* | 5/2016 | Johnson | B26B 21/521 30/532 |
| 2017/0043492 | A1 | 2/2017 | Robertson et al. | |
| 2017/0173806 | A1* | 6/2017 | Lee | B26B 21/521 |
| 2017/0282391 | A1* | 10/2017 | Provost | B26B 21/521 |
| 2020/0122348 | A1* | 4/2020 | Good | B26B 21/526 |
| 2021/0008745 | A1* | 1/2021 | Kruemke | B26B 21/521 |
| 2021/0086381 | A1* | 3/2021 | Avery | B26B 21/521 |
| 2021/0170616 | A1* | 6/2021 | Avery | B26B 21/521 |
| 2021/0187769 | A1* | 6/2021 | Kopelas | B26B 21/521 |
| 2021/0354321 | A1* | 11/2021 | Kopelas | B26B 21/521 |
| 2021/0354322 | A1* | 11/2021 | Kopelas | B26B 21/521 |
| 2022/0314479 | A1* | 10/2022 | Thompson | B26B 21/46 |
| 2023/0040429 | A1* | 2/2023 | Grinspun | B26B 21/525 |

FOREIGN PATENT DOCUMENTS

| | | | | | |
|---|---|---|---|---|---|
| EP | 2227360 | B1 | | 9/2010 | |
| EP | 3904022 | A1 | * | 11/2021 | B26B 21/222 |
| FR | 2660589 | A1 | * | 10/1991 | B26B 21/521 |
| FR | 2663255 | A2 | * | 12/1991 | B26B 21/225 |
| GB | 626031 | A | * | 7/1949 | B26B 21/222 |
| WO | 9737819 | A2 | | 10/1997 | |
| WO | 2018191229 | A1 | | 10/2018 | |
| WO | 2019067574 | A1 | | 4/2019 | |

* cited by examiner

MAGNETIC LOCK AND RELEASE MECHANISM FOR SKINCARE DEVICE

CROSS-REFERENCE TO RELATED APPLICATION(S)

This application claims benefit from European patent application EP 20172101.6 filed on 29 Apr. 2020, its content being incorporated herein by reference.

TECHNICAL FIELD

The present disclosure relates to the field of shavers, such as shavers in which a handle and a shaving head are removably connectable to one another so that one may be replaced while conserving the other, and connectors therefor.

BACKGROUND

Conventional refillable shavers use complicated mechanical assemblies to retain the shaver's shaving head to the shaver's handle. Examples of such assemblies include the cassette assembly disclosed in WO9737819, for example. Magnetic retention of a head to a handle is known, for example from U.S. Ser. No. 10/350,774B2, in which a magnet connected to the handle cooperates attractively with a magnet connected to the shaving head to retain the shaving head to the handle. In U.S. Ser. No. 10/350,774B2, removal of the shaving head from the handle is accomplished by overcoming the attraction between the head and handle magnets, and attachment of the shaving head to the handle is accomplished by approaching the magnet of the shaving head to the magnet of the handle until magnetic attraction becomes strong enough to draw the shaving head and handle together.

SUMMARY

A shaving head can be retained to a handle of a shaving device through magnetic repulsion. To that end, according to examples of the present disclosure, a connector may be provided for connecting a shaving head to a handle of a skincare device. The connector includes a first piece configured to be connected to the shaving head, a second piece configured to be connected to the handle, at least a first magnet connected to the first piece, and at least a second magnet connected to the second piece. The first and second pieces are insertable inside each other, meaning that one of the first and second pieces is insertable inside the other of the first and second pieces. The first and second pieces are insertable inside each other along an insertion direction. Equal poles of the first and second magnets are arranged obliquely or perpendicularly to the insertion direction for retaining the first and second pieces inside each other through magnetic repulsion.

Equal poles may be understood to mean non-opposite poles. For example, north poles of the first and second magnets are equal poles to each other; south poles of the first and second magnets are equal poles to each other.

Such a connector may be relatively simple compared to the cassette assembly, and offer an improved user experience compared to retention through magnetic attraction.

The first piece may be insertable inside the second piece.

The first and second pieces may be fixed in rotation with respect to each other about an insertion axis along which the first and second pieces are insertable inside each other.

The first magnet may be configured to move past the second magnet during insertion of the first and second pieces inside each other.

The first piece may include a spacer portion which extends from the first magnet past the second magnet when the first and second pieces are inserted inside each other.

The second magnet may be fixed with respect to the second piece.

The connector may include a third piece connected to the second piece. The second magnet may be fixed with respect to the third piece. The third piece may be movable with respect to the second piece between a first position and a second position. The second magnet may repel the first magnet in the first position, so as to increase insertion of the first and second pieces inside each other. The second magnet may repel the first magnet in the second position, so as to decrease insertion of the first and second pieces inside each other.

The first and second magnets may be configured to bias the third piece towards the first position when the spacer portion of the first piece extends past the second magnet.

The third piece may include a spacer portion which extends from the second magnet past the first magnet when the first and second pieces are inserted inside each other and the third piece is in the first position.

The third piece may be resiliently connected to the second piece so as to be biased towards the first position.

The second magnet may be configured to move past the first magnet when the third piece moves from the first position to the second position.

According to examples of the present disclosure, a skincare device may be provided, including a handle, a shaving head, and a connector as described earlier herein for connecting the shaving head to the handle.

The shaving head may include one or more cutting elements.

According to examples of the present disclosure, a shaving head may be provided for a skincare device as described earlier herein, including a connecting portion for connecting to a handle of the skincare device, the handle and connecting portion being insertable inside each other along an insertion direction, the connecting portion including a magnet whose poles are oriented obliquely or perpendicularly to the insertion direction for retaining the head to the handle through magnetic repulsion with the handle.

According to examples of the present disclosure, a handle may be provided for a skincare device as described earlier herein, including a connecting portion for connecting to a head of the skincare device, the head and connecting portion being insertable inside each other along an insertion direction, the connecting portion including a magnet whose poles are oriented obliquely or perpendicularly to the insertion direction for retaining the handle to the head through magnetic repulsion with the head.

BRIEF DESCRIPTION OF THE DRAWINGS

The disclosure may be more completely understood in consideration of the following detailed description of aspects of the disclosure in connection with the accompanying drawings, in which.

Figure 1:
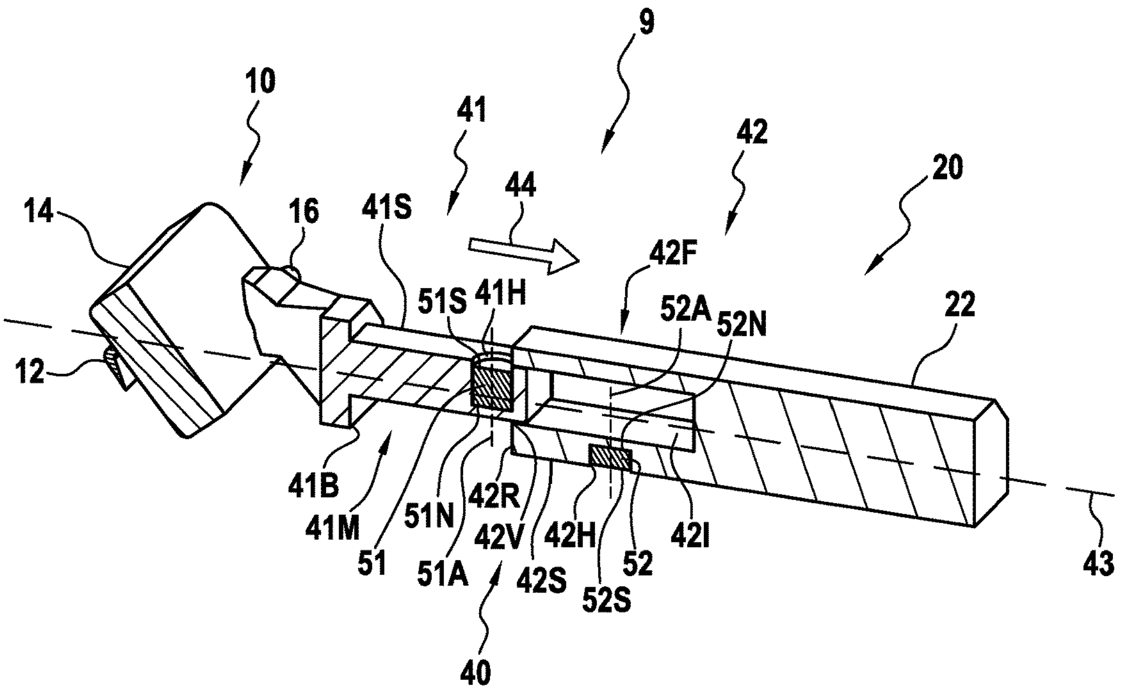
FIG. 1 shows an exemplary shaving device in cross-sectional view during attachment of its shaving head to its handle.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

DETAILED DESCRIPTION

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative aspects and are not intended to limit the scope of the disclosure. The illustrative aspects depicted are intended only as exemplary.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (for example, "between" versus "directly between," "adjacent" versus "directly adjacent," etc.).

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

FIG. 1 shows an exemplary shaving device 9 in cross-sectional view. The shaving device 9 includes a shaving head 10 and a handle 20 and is shown during attachment of its shaving head to its handle, by means of a connector 40 including connecting portions 41, 42 which will be discussed later.

The head 10 includes one or more cutting elements 12, which may be arranged inside a shaving cartridge 14 (represented schematically). The cutting element(s) 12 is/are able to be connected to the handle 20 by way of a connecting portion 41 of the head 10. The head's connecting portion 41 may be permanently or removably attached to the cutting element(s) 12. The head's connecting portion 41 is a non-limiting example of a first piece of the connector 40.

An articulation 16, for example a hinge, a flexure, or any suitable device for allowing movement of a shaving cartridge with respect to a handle of a shaving device during shaving, may be provided between the cutting element(s) 12 and the head's connecting portion 41. However, it is also contemplated for the cutting element(s) 12 to be rigidly connected to the head's connecting portion 41.

The handle 20 includes a grip portion 22 for allowing a user to maneuver the shaving device 9 during shaving. The grip portion 22 is able to be connected to the head 10 by way of a connecting portion 42 of the handle 10. The handle's connecting portion 42 may be permanently or removably attached to the grip portion 22. The handle's connecting portion 42 is a non-limiting example of a second piece of the connector 40.

The head's and handle's connecting portions 41, 42 can be directly connected to each other by being inserted inside each other along an insertion axis 43 by movement of the head 10 relative to the handle 20 in an insertion direction 44 therealong.

The head's connecting portion 41 includes a male portion 41M extending along the insertion axis 43, and away from the cutting element(s) 12, in the insertion direction 44.

The handle's connecting portion 42 is provided as a female portion 42F into which the male portion 41M is insertable. It is also contemplated, however, that the female portion 42F be provided on the head 10, and the male portion 41M be provided on the handle 20.

The female portion 42F includes an insertion hole 42I (in this case provided as a blind hole) extending along the insertion axis 43, with an opening 42V arranged opposite from a grip portion of the handle.

The head's connecting portion 41 and the handle's connecting portion 42 may include an abutment defining a maximum insertion of the male portion 41M inside the female portion 42F. In the present example, the abutment is provided through cooperation of a flange 41B provided on the head's connecting portion 41 and a rim 42R provided on the handle's connecting portion 42. The flange 41B is arranged between the male portion 41M and the cutting element(s) 12, and extends radially with respect to the insertion axis 43. The rim 42R surrounds the insertion hole's opening 42V, and bears on the flange 41B when the two connecting portions 41, 42 are fully inserted inside each other.

The cross-section(s) of the female 42F and/or male portion(s) may be substantially non-circular, as taken normal to the insertion direction 44, to prevent rotation of the head 10 relative to the handle 20 about the insertion axis 43 when their connecting portions 41, 42 are inserted inside each other.

The male portion 41M includes a spacer portion 41S and a magnet 51. The male portion's spacer portion 41S separates the male portion's magnet 51 from the flange 41B, and extends along the insertion axis 43 between them. As a non-limiting example, the male portion's spacer portion 41S may have a length of 2-2.3 cm (centimeters) as measured in the insertion direction from the flange 41B to the male portion's magnet 51.

The male portion's magnet 51 is provided in a magnet hole 41H provided in the male portion's spacer portion 41S.

The male portion's magnet hole 41H may be substantially oblique or perpendicular to the insertion direction 44. The male portion's magnet 51 is fixed relative to the male portion 41M in rotation about the insertion axis 43. In the shaving device illustrated in FIG. 1, the male portion's magnet 51 is also fixed in rotation about the insertion axis 43 with respect to the head 10. In the shaving device illustrated in FIG. 1, the male portion's magnet 51 is also fixed in translation along the insertion axis 43 with respect to the head's connecting portion 41.

The female portion 42F includes a magnet 52 which cooperates repulsively with the male portion's magnet 51 during insertion and withdrawal of the male 41M and female 42F portions inside/from each other. The male 41M and female 42F portions' magnets are arranged such that, when the head's and handle's connecting portions 41, 42 are fully inserted inside each other, the flange 41B is nearer to the female portion's magnet 52 than the flange is to male portion's magnet 51. The female portion's magnet 52 is fixed relative to the female portion 42F in rotation about the insertion axis 43, and in translation along the insertion axis. In the shaving device illustrated in FIG. 1, the female portion 42F is also fixed in translation and rotation with respect to the grip portion 22.

The male 41M and female 42F portions' magnets 51, 52 are oriented with respect to the insertion direction 44 and with respect to each other such that, when a user begins to insert the connecting portions 41, 42 of the head 10 and handle 20 inside each other—for example as with connecting a head to a handle for the first time—repulsion between the magnets biases the head and handle against insertion of their connecting portions inside each other, and when a user begins to withdraw the head and handle from each other—for example as with removing a head from a handle in order to replace the head—repulsion between the magnets biases the head and handle against withdrawal of the connecting portions from each other. When two magnets repel each other, the repulsion can be considered, from the perspective of a first of the two magnets, to be a repulsive force exerted on it by a second of the two magnets.

The male portion's magnet 51 includes a magnetic axis 51A, which is a straight line joining its north pole 51N and its south pole 51S. The female portion's magnet 52 includes a magnetic axis 52A, which is a straight line joining its north pole 52N and its south pole 52S.

The male 41M and female 42F portions' magnets' poles are oriented oblique or perpendicular to the insertion direction, meaning that each of these magnets' respective magnetic axes 51A, 52A may be angled up to 90 degrees with respect to the insertion direction 44. The magnetic axis 52A of the female portion's magnet 52 may be angled an equivalent amount as the magnetic axis 51A of the male portion's magnet 51 with respect to the insertion direction 44; however, it is also contemplated for the magnetic axis 52A of the female portion's magnet 52 to be oriented at a different angle with respect to the insertion direction from the magnetic axis 51A of the male portion's magnet 51.

The female portion's magnet 52 may be provided in a magnet hole 42H of the female portion 42F. The female portion's magnet hole 42H may extend obliquely or perpendicularly with respect to the insertion direction 44.

The female portion 42F includes a spacer portion 42S which separates the female portion's magnet 52 from the rim 42R. When the male portion 41M is inserted to a depth within the female portion 42F such that the flange 41B is nearer to the male portion's magnet (in this case the head's magnet) 51 than to the female portion's magnet (in this case the handle's magnet) 52, and/or such that the male portion's magnet (in this case the head's magnet) 51 is at a position along the insertion axis 43 that is intermediate a position of the rim 42R along the insertion axis and a position of the female portion's magnet (in this case the handle's magnet) 52 along the insertion axis 43, the female portion's spacer portion 42S prevents excessive deviation of the male portion 41M in directions perpendicular to the insertion direction 44, under the effect of repulsion between the male 41M and female 42F portions' magnets 51, 52.

The female portion's spacer portion 42S is sufficiently long, as measured in the insertion direction 44, that repulsion between the connecting portions' magnets 51, 52 does not substantially interfere with aligning the connecting portions 41, 42 of the head 10 and handle 20 to the insertion axis prior to insertion. For example, the female portion's spacer portion 42S may be 1-1.5 cm (centimeters).

The female portion's spacer portion 42S is arranged to extend from the rim 42R, along the insertion axis 43, to the female portion's magnet 52. However, other spacers and/or locations on the male 41F and/or female 42F portion(s) are also contemplated, which would also allow insertion to be initiated before repulsion between the male and female portions' magnets 51, 52 makes alignment of the connecting portions 41, 42 to the insertion axis 43 difficult.

Figure 2:
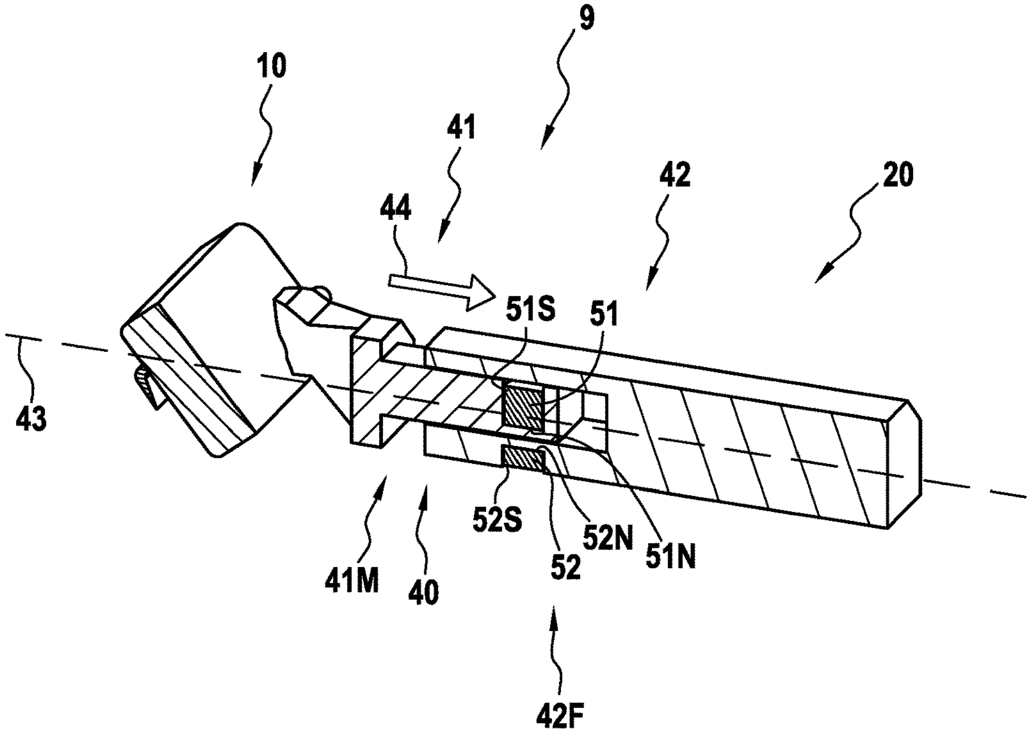
FIG. 2 shows the shaving device of FIG. 1 during passage of a magnet of the shaving head past a magnet of the handle.
Figure 3:
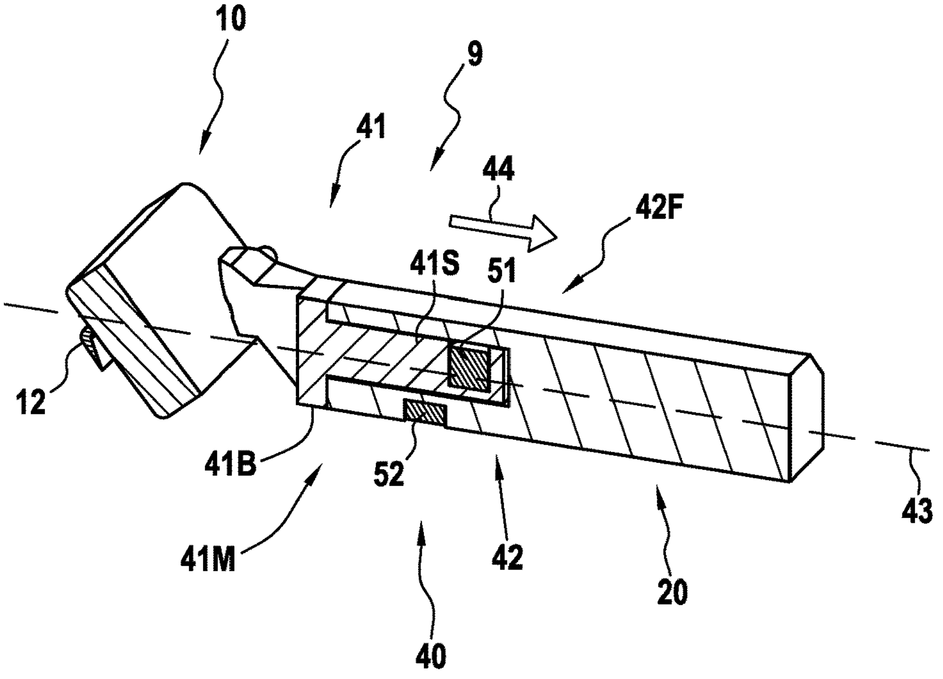
FIG. 3 shows the shaving device of FIG. 1 with the shaving head retained inside the handle.

FIG. 3 shows the shaving device 9 of FIG. 1 with the male 41M and female 42F portions fully inserted inside each other; FIG. 2 shows the shaving device 9 of FIG. 1 during movement from the position shown in FIG. 1 to the position shown in FIG. 3. As seen in FIG. 2, this movement causes the male portion's magnet 51 to pass the female portion's magnet 52. As the male 41M and female 42F portions are inserted into each other, moving from the position shown in FIG. 1 towards the position shown in FIG. 2, the male and female portions' magnets 51, 52 are made to approach one another, causing an increase in repulsion between them. Although the handle's magnet (in this case the female portion's magnet 52) exerts a repulsive force on the male portion's magnet 51 with a component directed perpendicular to the insertion direction 44 and with a component directed opposite to the insertion direction 44, the female portion 42 applies a contact force to the male portion 41 cancels out the component of the repulsive force directed perpendicular to the insertion direction 44. As such, the repulsion sensible by the user may correspond substantially to the component of the repulsive force that is substantially opposite to the insertion direction 44, which may be perceived by a user of the shaving device 9 as resistance of the connector 40 against connecting the connection portions 41, 42 of the head 10 and handle 20 together.

In FIG. 2, the male and female portions' magnets 51, 52 are oriented such that equal poles of the male and female portions' magnets are arranged to face in opposite directions as each other—for example, the north pole 52N of the female portion's magnet 52 is arranged to face the north pole 51N of the male portion's magnet 51, (though it is contemplated as an alternative for the south pole 52S of the female portion's magnet to be arranged to face the south pole 51S of the male portion's magnet). When equal poles of the male and female portions' magnets face in opposite directions as each other, it is possible to bring the male portion's magnet 51 into a position along the insertion axis 43 relative to the female portion's magnet 52 such that the net repulsive force exerted on the male portion's magnet 51 by the female portion's magnet 52 lacks (at least temporarily) components directed along the insertion axis 43.

In the present example, the net repulsive force exerted on the male portion's magnet 51 by the female portion's magnet 52 lacks (at least temporarily) components directed along the insertion axis 43 when the poles arranged to face in opposite direction as each other (in this case the magnets' respective north poles 51N, 52N) have the approximately the same position as each other along the insertion axis 43.

In the present example, the respective north poles 51N, 52N of the male and female portions' magnets 51, 52 have approximately the same position as each other along the insertion axis 43 when the two magnets 51, 52 move past each other. Two magnets can be considered to move past one another when the positions along the insertion axis 43 of the front and rear extremities of one of the two magnets (for example the male portion's magnet 51) are arranged between or coincident with the positions along the insertion axis of the front and rear extremities of the other of the two magnets (for example the female portion's magnet 52). A given magnet's front extremity is an extremity of its front surface extending in the insertion direction 44, whereas its rear extremity is an extremity of its rear surface extending opposite the insertion direction 44; its front surface is a surface arranged to face the insertion direction 44, whereas its rear surface is a surface arranged to face opposite the insertion direction 44.

In the present example, the male and female portions magnets' 51, 52 are identical to one another. Although they are each represented as cylindrical bar magnets, it is also contemplated for one or both magnets to be provided as any other suitable form or geometry.

As the component directed opposite to the insertion direction 44 of the repulsive force exerted by the handle's magnet (in this case the female portion's magnet 52) on the head's magnet (in this case the male portion's magnet 51) diminishes, the user of the shaving device 9 may perceive the resistance of the connector 40 to connecting the head 10 and handle 20 together as decreasing.

Comparison of FIGS. 1 & 3 reveals that the magnets 51, 52 of the male 41M and female 42F portions have swapped positions along the insertion axis 43 relative to each other, such that the flange 41B is now closer to the female portion's magnet 52 than to the male portion's magnet 51. Similarly, the cutting element(s) 12 can be seen to be closer to the handle's connecting portion's magnet (in this case the female portion's magnet 52) than to the head's connecting portion's magnet (in this case the male portion's magnet 51).

When the connecting portions 41, 42 are in the position shown in FIG. 3, the repulsive force exerted by the handle's magnet (in this case the female portion's magnet 52) on the head's magnet (in this case the male portion's magnet 51) includes a component directed in the insertion direction 44, which retains the male portion 41M inside the female portion 42F, and thus the head 10 to the handle 20.

As insertion proceeds from the position shown in FIG. 2 to the position shown in FIG. 3, the male portion's spacer portion 41S, causes the male portion's magnet 51 to advance past the female portion's magnet 52. Thus, the male portion's spacer portion 41S is made to extend past the female portion's magnet 52. The component directed in the insertion direction 44 of the repulsive force exerted on the head's magnet (in this case the male portion's magnet 51) by the handle's magnet (in this case the female portion's magnet 52) increases. The user of the shaving device 9 may perceive the connector 40 as beginning to urge the male portion 41M into the female portion 42F.

The head 10 may be disconnected from the handle 20 by moving the head with respect to the handle opposite to the insertion direction 44. During disconnection of the head 10 from the handle 20, the relative positions of the male 41M and female 42F portions' magnets 51, 52 to one another along the insertion axis 43 are made to approach one another. The repulsive force of the handle's magnet (in this case the female portion's magnet 52) on the head's magnet (in this case the male portion's magnet 51) may increase. Since contact between the male 41M and female 42F portions cancels the component of the repulsive force that is oriented perpendicular to the insertion direction 44, this increase in the repulsive force may be perceived by the user as resistance by the connector 40 to withdrawal of the male portion 41M from the female portion 42F.

As the male 41M and female 42F portions are withdrawn to the position illustrated in FIG. 2, the component directed in the insertion direction 44 of the repulsive force exerted by the handle's magnet (in this case the female portion's magnet 52) on the head's magnet (in this case the male portion's magnet 51) diminishes. The user may perceive this as a decrease in resistance by the connector 40 to disconnection of the head's connection portion 41 from the handle's connection portion 42.

After the male 41M and female 42F portions are withdrawn from each other beyond the position illustrated in FIG. 2, the repulsive force of the handle's magnet (in this case the female portion's magnet 52) on the head's magnet (in this case the male portion's magnet 51) regains its component directed opposite to the insertion direction 44. The user may perceive the return of this component as the connector 40 urging male portion 41M to withdraw from the female portion 42F.

Although the foregoing description concerned a shaving device 9, whose head 10 includes a connecting portion 41 with a flange 41B and a male portion 41M, and whose handle 20 includes a connecting portion 42 with a rim 42R and a female portion 42F, it is also contemplated for the head's connecting portion to include the rim and female portion, and for the handle's connecting portion to include the flange and male portion.

Figure 4:
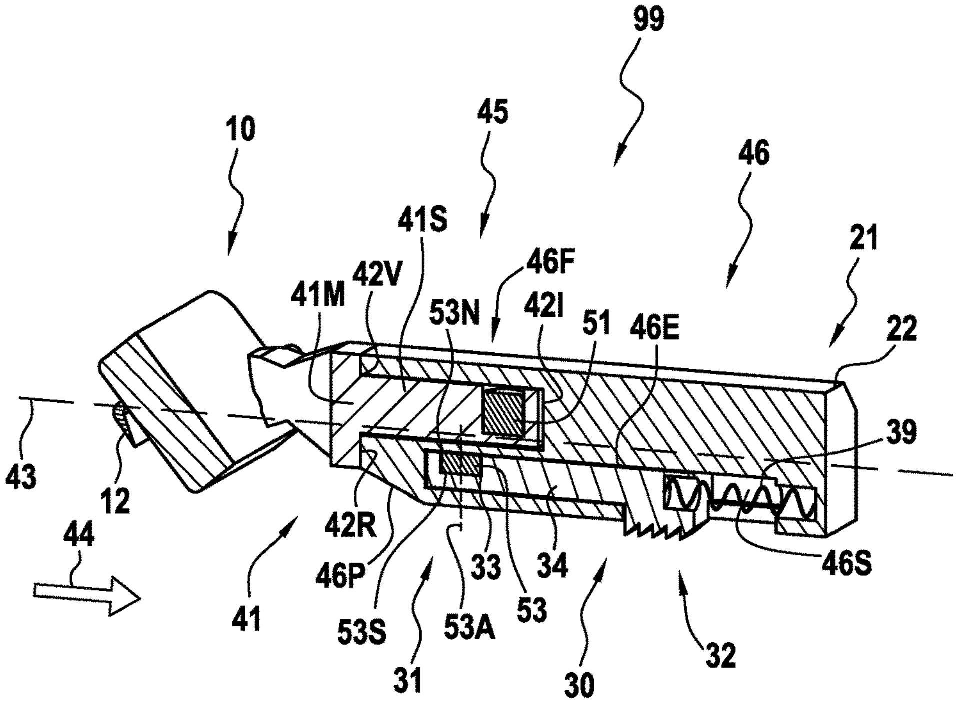
FIG. 4 shows an exemplary shaving device in cross-sectional view with its shaving head retained inside its handle.

FIG. 4 shows an exemplary shaving device 99 in cross-sectional view with its shaving head 10 retained inside its handle 21 by means of the shaving device's connector 45, shown with the male 41M and female portions 46F of the head's connecting portion 41 and the handle's connecting portion 46 fully inserted inside each other. The head 10, grip portion 22, rim 42R, and insertion hole 42I of the shaving device 99 and connector 45 are identical to those seen in FIG. 1. Identical reference numbers in FIG. 1-4 designate to identical items.

The connector 45 includes an ejection switch 30. The switch 30 is a non-limiting example of a third piece of the connector 45. The switch 30 is movable between a retaining position and an ejecting position. Moving from the retaining position to the ejecting position involves a net translation of the switch 30 in the insertion direction 44.

The switch 30 includes a magnet 53 (in this case the handle's magnet) to cooperate repulsively with the head's magnet (in this case the male portion's magnet 51). The switch's magnet 53 includes a magnetic axis 53A, which is a straight line joining its north pole 53N and its south pole 53S. The magnetic axis 53A of the switch's magnet 53 may be angled up to 90 degrees with respect to the insertion direction 44. The switch's magnet 53 is fixed in rotation about the insertion axis 43.

The handle's connecting portion 46 may include a switch slot 46S, which in this case is provided in an exterior surface 46E of the female portion 46F. The switch's magnet 53 is slidable within the switch slot 46S between the retaining and ejecting positions.

The switch slot 46S may retain the switch's magnet 53 radially with respect to the insertion axis 43, and possibly also in rotation about the insertion axis. This will be discussed in greater detail with regard to FIG. 5.

The switch 30 is permanently or removably attached to the handle's connecting portion 46 (which in this case includes the female portion 46F, including the rim 42R and insertion hole 42I). A resilient component 39, for example a spring (represented schematically), is provided between the switch 30 and the handle's connecting portion 46, to bias the switch towards the retaining position. The resilient component 39 may be at a rest position when the switch 30 is in the retaining position.

When the male 41M and female 46F portions are fully inserted inside each other, and the switch 30 is in the retaining position, the switch's magnet 53 and the head's magnet 51 repel one another so as to increase insertion of the male 41M and female 46F portions inside each other. For example, when the head's connecting portion 41 and the handle's connecting portion 46 are fully inserted inside each other, and the switch 30 is in the retaining position, the position of the switch's magnet 53 along the insertion axis 43 is intermediate those of the head's magnet 51 and the cutting element(s) 12. In this position, the head's spacer portion 41S extends past the switch's magnet 53, along the insertion axis 43.

The handle's connecting portion's spacer portion 46P (in this case the female portion's spacer portion) has a length as measured in the insertion direction 44, from the opening 42V to the switch's magnet 53 in the retaining position. The length of the handle's connecting portion's spacer portion 46P may be approximately 1-1.5 cm, for example.

The switch 30 may include a magnet-retaining portion 31 for retaining the switch's magnet 53, and a manipulation portion 32 for allowing a user to move the switch's magnet between the retaining and ejecting positions. The magnet-retaining portion 31 may include a magnet hole 33, in which the switch's magnet 53 is disposed.

The manipulation portion 32 may protrude away from the insertion axis 43 with respect to the handle's connecting portion 46, and/or may present a textured surface arranged away from the handle's connecting portion, to allow a user to gain purchase on the switch 30 during movement between the retaining and ejecting positions.

When the switch 30 is in the retaining position and the connecting portions 41, 46 of the head 10 and handle 20 are retained inside each other, the switch's magnet 53 (and the magnet-retaining portion 31, when present) may be arranged in an extremity of the switch slot 46S which is relatively near to the cutting element(s) 12. For example, the magnet-retaining portion 31 may be arranged to abut this extremity of the switch slot 46S.

The switch 30 may be provided with a spacer portion 34 that separates the magnet-retaining portion 31 from the manipulation portion 32. For example, the switch's spacer portion 34 may extend from the switch's magnet 53 to the manipulation portion 32 and past the head's magnet 51 when the switch's magnet is in the retaining position and the male 41M and female 46F portions are fully inserted inside each other. The switch's spacer portion 34 may allow the manipulation portion 32 to be relatively remote from the cutting element(s) 12, compared to the switch's magnet 53.

The head's connecting portion 41 and the handle's connecting portion 46 can be connected to one another in a similar manner to the connection portions described with respect to FIG. 1-3.

When insertion begins, the switch's magnet 53 exerts a repulsive force on the head's magnet 51 that includes a component directed opposite to the insertion direction 44, and a component directed perpendicular to the insertion direction 44. Contact forces between the male 41M and female 46F portions cancel the component directed perpendicular to the insertion direction in the same manner as described with regard to FIG. 1-3. The component of the repulsive force that is directed opposite to the insertion direction 44 may be perceived by the user as resistance by the connector 45 to insertion of the male 41M and female 46F portions into each other.

As insertion progresses, the position of the head's magnet 51 relative to the switch's magnet 53 along the insertion axis 43 becomes such that the repulsive force exerted by the switch's magnet 53 on the head's magnet 51 and the switch's magnet 53 (at least temporarily) lacks components directed along the insertion axis 43. The male 41M and female 46F portions limit or prevent movement of the head's magnet 51 perpendicular to the insertion direction 44. Additionally, the switch 30 and/or the switch slot 46S limit(s) or prevent(s) movement of the switch's magnet 53 perpendicular to the insertion direction 44. This will be discussed in greater detail with regard to FIG. 5.

Figure 5:
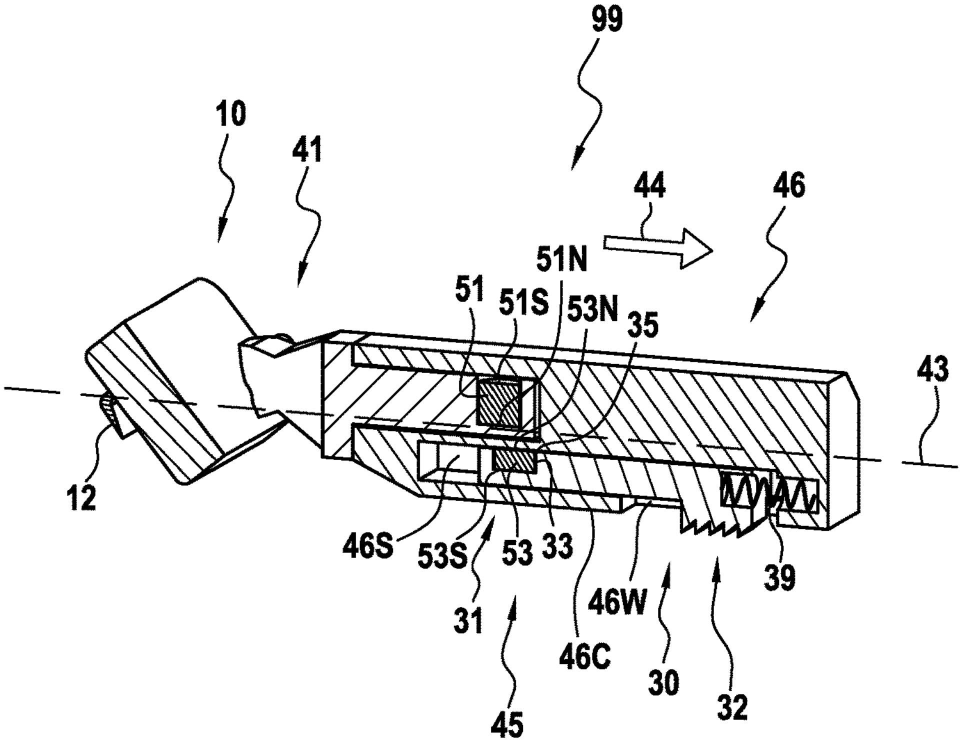
FIG. 5 shows the shaving device of FIG. 4 during passage of a magnet of an ejection switch of the handle past a magnet of the shaving head.
Figure 6:
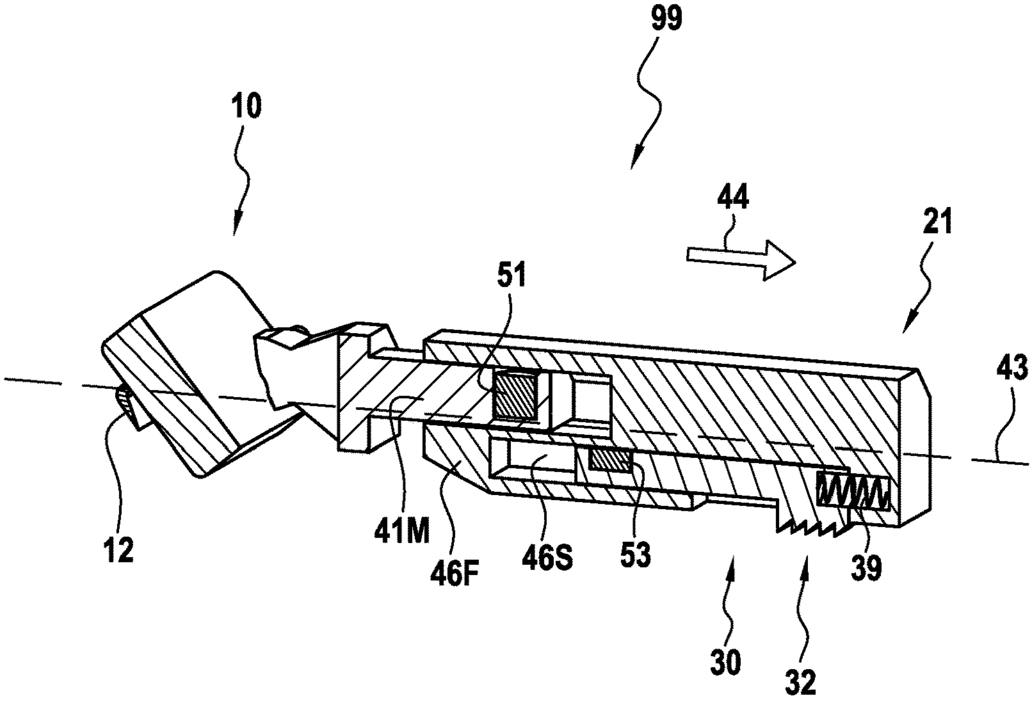
FIG. 6 shows the shaving device of FIG. 4 during ejection of the head from the handle.

When the position of the switch's magnet 53 along the insertion axis 43 is intermediate those of the head's magnet 51 and the cutting element(s) 12, the repulsive force exerted by switch's magnet 53 on the head's magnet 51 includes a component directed in the insertion direction 44. The user may perceive this repulsion as the connector 45 urging the male portion 41M into the female portion 46F. Additionally, the head's magnet 51 can be considered to exert a repulsive force on the switch's magnet 53, opposite to that of the repulsive force exerted by the switch's magnet 53 on the head's magnet 51. The repulsive force exerted on the switch's magnet 53 by the head's magnet 51 includes a component directed opposite to the insertion direction 44. The repulsive force exerted on the switch's magnet 53 by the head's magnet 51 in this position may be perceived by the user as biasing the switch 30 towards the retaining position, independently of whether a resilient component 39 is also provided to bias the switch's magnet 53 towards the retaining position. FIG. 5 shows the shaving device 99 of FIG. 4 during movement of the switch 30 from its position seen in FIG. 4, where the switch is in the retaining position, towards its position as seen in FIG. 6, where the switch is in the ejecting position.

As the switch 30 moves from the retaining position to the ejecting position, it undergoes a translation in the insertion direction 44. For example, the net translation of the switch's magnet 53 when moved from the retaining position to the ejecting position may be approximately 1-1.5 cm in the insertion direction 44.

When the connector's connection portions 41, 46 abut one another, movement of the head 10 in the insertion direction relative to the handle 20 is prevented. The translation of the switch's magnet 53 from the retaining position to the ejecting position causes the switch's magnet and the head's magnet 51 to pass each other. As the switch's magnet 53 moves from the retaining position towards the position shown in FIG. 5, the magnets 51, 53 of the head 10 and switch 30 are made to approach one another, causing an increase in repulsion between them. The repulsive force exerted by the head's magnet 51 on the switch's magnet 53 includes a component directed opposite to the insertion direction 44 and a component directed perpendicular to the insertion direction 44. The switch 30 and/or switch slot 46S counteract the component of the repulsive force exerted by the head's magnet 51 on the switch's magnet 53. As the head's magnet 51 and the switch's magnet 53 approach one another, the component of the repulsive force exerted by the head's magnet 51 on the switch's magnet that is directed opposite the insertion direction increases, and may be perceived by a user of the shaving device 99 as resistance by the connector 45 against disconnection of the connector's connecting portions 41, 46 from one another.

The head's and switch's magnets 51, 53 are oriented such that equal poles of the head's and switch's magnets (in this case north poles 51N, 53N, though south poles 51S, 53S are also contemplated) are arranged to face in opposite directions as each other, as described with respect to the magnets of FIG. 2. When, as seen in FIG. 5, equal poles of these magnets have approximately the same position as each other along the insertion axis 43, the repulsive force exerted by the switch's magnet 53 on the head's magnet 51 lacks (at least temporarily) components directed along the insertion axis 43. As mentioned earlier, cooperation between the male 41M and female portions 46F can stabilize the head's magnet 51 with respect to the insertion axis 43. Additionally, the repulsive force exerted by the head's magnet 51 on the switch's magnet 53 lacks (at least temporarily) components directed along the insertion axis 43. The switch slot 46S stabilizes the switch's magnet 53 relative to the insertion axis 43. For example, the switch's magnet 53 may be enclosed within the magnet-retaining portion 31, and the switch slot 46S may stabilize the magnet-retaining portion relative to the insertion axis 43.

When the switch's magnet 53 is not enclosed within the magnet-retaining portion 31, the magnet-retaining portion's magnet hole 33 may be provided as a blind hole which opens towards the insertion axis. In this way, magnetic repulsion between the head's magnet and the switch's magnet may urge the switch's magnet into the magnet-retaining portion's magnet hole, in a direction away from the magnet hole's opening 35.

When repulsion between the head's magnet 51 and the switch's magnet 53 is susceptible to dislodge the switch's magnet from the magnet-retaining portion 31, the switch slot 46S may be arranged such that a surface of the switch slot limits movement of the switch's magnet relative to the magnet-retaining portion 31.

The switch slot 46S may surround the magnet-retaining portion 31 in all directions perpendicular to the insertion direction 44, for example. A window 46W may be practiced in a peripheral wall 46C of the switch slot 46S, which is on an opposite side of the switch slot from the insertion axis 43. The manipulation portion 32 of the ejection switch 30 may protrude through the window 46W. The window 46W may have a length as measured in the insertion direction 44 that is sufficient for allowing the manipulation portion 32 to move the switch's magnet 53 between the retaining and ejecting positions.

As the switch's magnet 53 advances past the head's magnet 51, repulsion of the switch's magnet from the head's magnet transitions from being substantially perpendicular to the insertion direction to being such that the head's magnet repels the switch's magnet in the insertion direction 44. A user may perceive this transition as a decrease in resistance by the connector 45 to moving the switch 30 to the ejecting position.

When the resilient element 39 is provided, the biasing force may be sufficient to prevent the repulsion between the switch's magnet 53 and the head's magnet 51 from moving the switch's magnet into the ejecting position during insertion of the male 41M and female 46F portions into each other.

When the switch 30 is in the ejecting position, the switch's magnet 53 and the head's magnet 51 repel one another so as to decrease insertion of the male portion 41M inside the female portion 46F. For example, when the head's connecting portion 41 and the handle's connecting portion 46 are fully inserted inside each other, and the switch 30 is in the ejecting position, the position of the head's magnet 51 along the insertion axis 43 is intermediate those of the switch's magnet 53 and the cutting element(s) 12. The switch's magnet 53 repels the head's magnet 51 opposite to the insertion direction 44.

FIG. 6 shows the shaving device 99 of FIG. 4 during ejection of the head 10 from the handle 21. The switch 30 is shown in the ejection position, in this case abutting an extremity of the switch slot 46S which is remote from the head 10.

The positions of these magnets 51, 53 relative to each other along the insertion axis 43 is reversed with respect to that shown in FIG. 4, such that the cutting element(s) 12 is/are closer to the head's magnet than to the switch's magnet, and the repulsive force exerted on the head's magnet 51 by the switch's magnet 53 has urged the male portion 41M to begin withdrawing from the female portion 46F.

After the user releases the switch 30, the resilient element 39 returns to its rest position, moving the switch opposite to the insertion direction 44. If the head 10 and handle 21 are not fully withdrawn from one another, this movement of the switch 30 may cause the switch's magnet 53 to approach the head's magnet 51, increasing the repulsive force exerted on the head's magnet by the switch's magnet (including its component directed opposite to the insertion direction 44), and further encouraging withdrawal of the male 41M and female 46F portions from each other.

This movement of the switch 30 may also be performed by the user, for example as an alternative to or so as to supplement the action of the resilient element 39. When no resilient element is provided 39, or when the biasing action of the resilient element is insufficient to prevent the switch 30 from being moved into the ejecting position during insertion of the male 41M and female 46F portions inside each other, the user may use the manipulation portion 32 to maintain the switch's magnet in the retaining position until the male and female portions are fully inserted inside each other.

Although the foregoing discussion showed the manipulation portion 32 as being moved in the insertion direction 44 in order to move the switch's magnet 53 from the retaining position to the ejecting position, it is contemplated, as an alternative, for the switch 30 to be configured such that the switch's magnet moves in the insertion direction 44 in response to movement of the manipulation portion opposite to the insertion direction. For example a user may be able to move the switch's magnet 53 from the retaining position to the ejecting position by moving the manipulation portion 32 towards the head 10.

Although the foregoing discussion related to connecting a shaving head to a handle of a skincare device, it is also contemplated to provide such connectors to other sorts of skincare devices. For example, the connector may be provided to connect an exfoliator head to a handle of a skincare device.

Although the described embodiments were provided as different exemplary embodiments, it is envisioned that these embodiments are combinable or, when not conflicting, the features recited in the described embodiments may be interchangeable. Moreover, the features recited in the described embodiments are not inextricably linked to one another, unless such a linkage is clearly indicated between two given features.

Throughout the description, including the claims, the term “comprising a” should be understood as being synonymous with “comprising at least one” unless otherwise stated. In addition, any range set forth herein, including the claims should be understood as including its end value(s) unless otherwise stated. Specific values for described elements should be understood to be within accepted manufacturing or industry tolerances known to one of skill in the art, and any use of the terms “substantially” and/or “approximately” and/or “generally” should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A connector for a skincare device, the connector comprising:
- a first piece,
- a second piece,
- at least a first magnet connected to the first piece, and
- at least a second magnet in the second piece,
- wherein the first piece is insertable into the second piece along an insertion axis, and
- wherein the first magnet and the second magnet are each arranged with a magnetic axis arranged perpendicularly to the insertion axis and with a north to south magnetic direction of the first magnet opposite to a north to south magnetic direction of the second magnet for retaining the first piece in the second piece through magnetic repulsion of equal poles of the first magnet and the second magnet, wherein the magnetic axes are respective straight lines between a center of a magnetic north pole and a center of a magnetic south pole of the magnets.

2. The connector of claim 1, wherein the first piece includes a protrusion that is insertable into an inside of a recess of the second piece.

3. The connector of claim 1, wherein the first piece and the second piece are fixed in rotation with respect to each other about the insertion axis.

4. The connector of claim 1, wherein the first magnet is configured to move past the second magnet during insertion of the first piece into the second piece.

5. The connector of claim 1, wherein the first piece comprises a spacer portion which extends from the first magnet toward a portion of the first piece configured to be connected to a shaving head of the skincare device.

6. The connector of claim 1, wherein the second magnet is fixed with respect to the second piece.

7. The connector of claim 1, wherein the first piece and the second piece define an abutment defining a maximum insertion of the first piece into the second piece.

8. The connector of claim 7, wherein the abutment includes a flange on the first piece and a rim on the second piece.

9. The connector of claim 8, wherein the flange is configured to contact the rim to define the maximum insertion of the first piece into the second piece.

10. The connector of claim 1, wherein the first piece is connected to a shaving head of the skincare device.

11. The connector of claim 1, wherein the second piece defines at least a portion of a handle of the skincare device.

12. A skincare device including the connector according to claim 1, the skincare device comprising:
- a handle, the second piece defining at least a portion of the handle, and
- a shaving head, the first piece connected to the shaving head.

13. A connector for a skincare device, the connector comprising:
- a first piece,
- a second piece,
- at least a first magnet connected to the first piece,
- at least a second magnet in the second piece,
- wherein the first piece is insertable into the second piece along an insertion axis, and
- wherein the second piece includes a switch, the second magnet being fixed with respect to the switch, the switch being movable with respect to the second piece between a first position, in which the second magnet repels the first magnet in a first direction along the insertion axis toward the second piece, and a second position, in which the second magnet repels the first magnet in a second direction opposite to the first direction to separate the first piece from the second piece.

14. The connector of claim 13, wherein the first magnet and the second magnet are configured to bias the switch towards the first position when the first piece is fully inserted into the second piece.

15. The connector of claim 13, wherein the switch comprises a spacer portion which extends from the second magnet away from a connection end of the second piece with the first piece.

16. The connector of claim 13, wherein the second piece further includes:
- a resilient component to bias the switch towards the first position.

17. The connector of claim 13, wherein the second magnet is configured to move past the first magnet when the switch moves from the first position to the second position.

18. The connector of claim 13, wherein the second piece includes a switch slot to receive the switch.

19. The connector of claim 18, wherein the second piece is configured to retain the switch in the switch slot in a radial direction of the insertion axis.

20. A connector for a skincare device, the connector comprising:
- a first piece,
- a second piece,
- at least a first magnet connected to the first piece, and
- at least a second magnet in the second piece,
- wherein the first piece is insertable into the second piece along an insertion axis, and
- wherein the first magnet and the second magnet are each arranged with a first straight line joining a north pole of the first magnet and a south pole of the first magnet and a second straight line joining a north pole of the second magnet and a south pole of the second magnet arranged perpendicularly to the insertion axis and with a direction along the first straight line from the north pole of the first magnet to the south pole of the first magnet being opposite to a direction along the second straight line from the north pole of the second magnet to the south pole of the second magnet for retaining the first piece in the first piece through magnetic repulsion of equal poles of the first magnet and the second magnet.

* * * * *